(12) United States Patent
Yamaoka

(10) Patent No.: US 9,896,098 B2
(45) Date of Patent: Feb. 20, 2018

(54) VEHICLE TRAVEL CONTROL DEVICE

(71) Applicant: TOYOTA JIDOSHA KABUSHIKI KAISHA, Toyota-shi, Aichi (JP)

(72) Inventor: Masaaki Yamaoka, Susono (JP)

(73) Assignee: TOYOTA JIDOSHA KABUSHIKI KAISHA, Toyota-Shi, Aichi (JP)

( * ) Notice: Subject to any disclaimer, the term of this patent is extended or adjusted under 35 U.S.C. 154(b) by 0 days.

(21) Appl. No.: 15/068,809

(22) Filed: Mar. 14, 2016

(65) Prior Publication Data

US 2016/0318512 A1 Nov. 3, 2016

(30) Foreign Application Priority Data

May 1, 2015 (JP) .................................. 2015-094282

(51) Int. Cl.
*B60W 30/12* (2006.01)
(52) U.S. Cl.
CPC .................. *B60W 30/12* (2013.01)

(58) Field of Classification Search
CPC ...................................................... B60W 30/12
See application file for complete search history.

(56) References Cited

U.S. PATENT DOCUMENTS

2009/0319113 A1 12/2009 Lee
2012/0283911 A1* 11/2012 Lee ..................... B60W 50/085
701/41

* cited by examiner

*Primary Examiner* — Mussa A Shaawat
*Assistant Examiner* — Michael V Kerrigan
(74) *Attorney, Agent, or Firm* — Sughrue Mion, PLLC

(57) ABSTRACT

A vehicle travel control device that makes a vehicle travel on the basis of a target travel trajectory, wherein when it is determined that the direction of the vehicle is outward in the lane width direction on the basis of the lane center of the target lane, the vehicle travel control device generates the target travel trajectory on the assumption that the direction of the vehicle is a direction along the lane center of the target lane or is inward in the lane width direction on the basis of the lane center of the target lane.

4 Claims, 9 Drawing Sheets

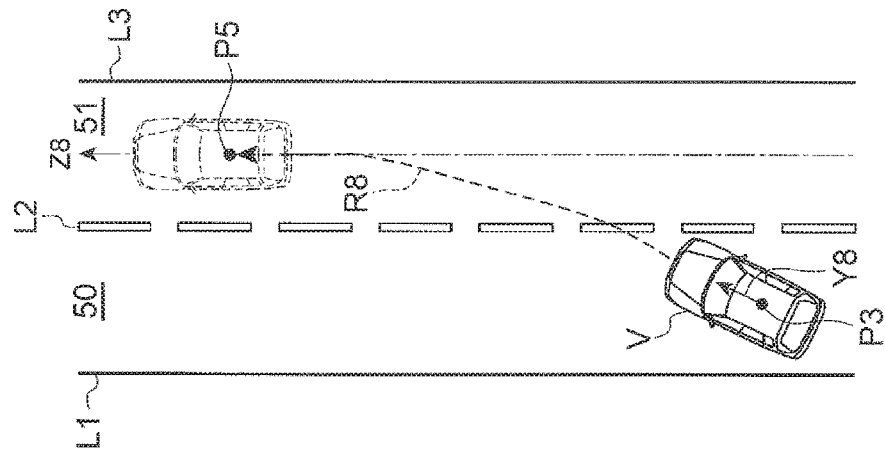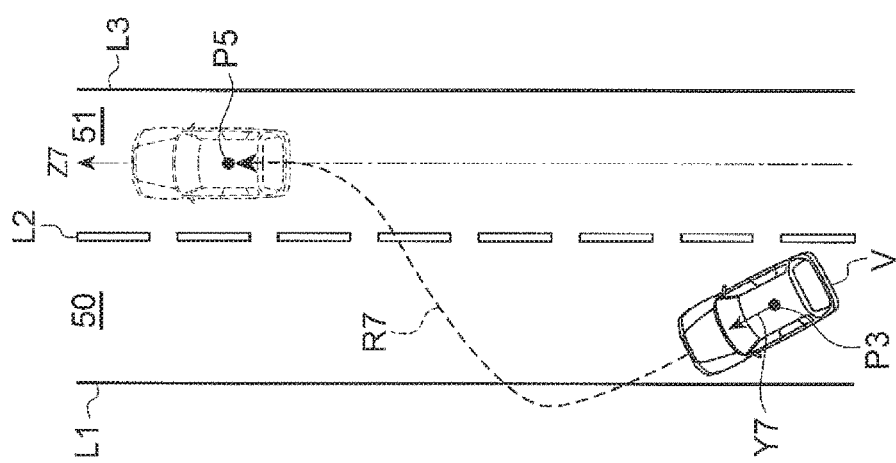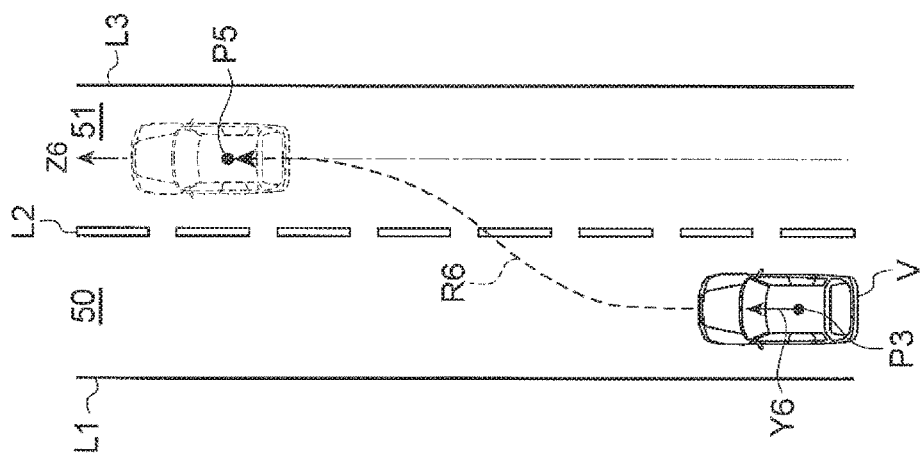

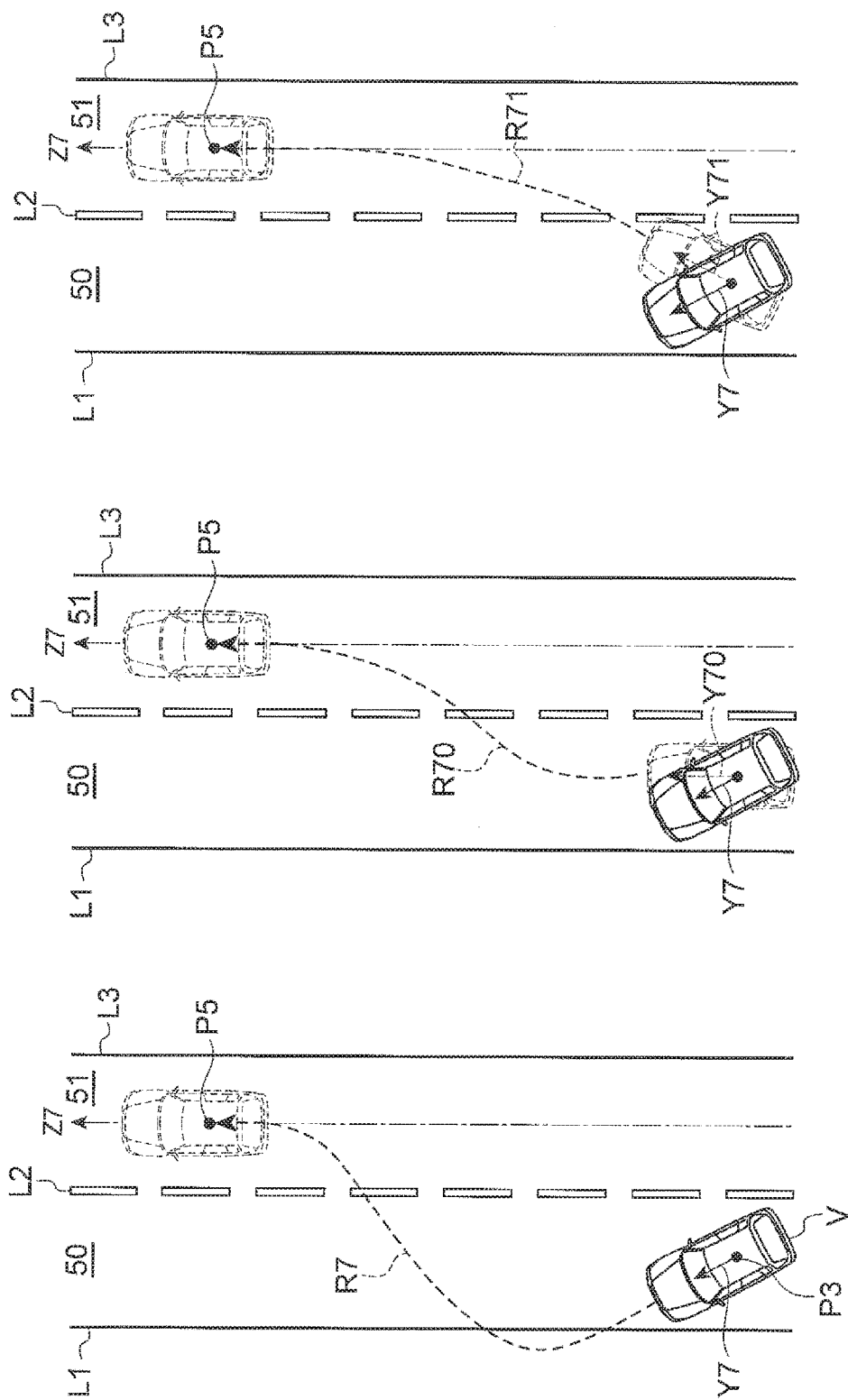

VEHICLE TRAVEL CONTROL DEVICE

CROSS-REFERENCE TO RELATED APPLICATION

This application is based on Japanese Patent Application No. 2015-094282 filed with Japan Patent Office on May 1, 2015, the entire contents of which are hereby incorporated by reference.

TECHNICAL FIELD

The present invention relates to a vehicle travel control device.

BACKGROUND

Specification of US Patent application publication No. 20120283911 discloses a device that controls the steering of a vehicle. This device generates a smooth target travel trajectory from a travel position to a lane center position, on the basis of the direction (vehicle yaw angle) of the vehicle and a time taken until the vehicle is located from a travel position to a lane center, and adjusts the steering of the vehicle using the target travel trajectory.

SUMMARY

However, when the direction of the vehicle is outward with respect to the extending direction of the lane center position, the device disclosed in Specification of US Patent application publication No. 20120283911 generates a target travel trajectory expanding in the outside direction (direction away from the lane center) of the travel lane. When the vehicle is made to travel using such a target travel trajectory, the vehicle moves in an arc in a direction away from the lane center position, and thus there may be a concern that the vehicle departs from the travel lane.

In this technical field, when the vehicle is made to travel on the basis of the target travel trajectory from the travel position to the target lateral position, a vehicle travel control device capable of preventing the vehicle from departing from the travel lane is required.

According to an aspect of the present invention, there is provided a vehicle travel control device vehicle travel control device that makes a vehicle travel on the basis of a target travel trajectory, including: an acquisition unit configured to acquire a direction and a travel position of the vehicle; a trajectory generation unit configured to generate a target travel trajectory from the travel position to a lane center position of a target lane on the basis of a direction of the vehicle, the travel position and the lane center position of the target lane; a travel control unit configured to make the vehicle travel using the target travel trajectory; and a determination unit configured to determine whether the direction of the vehicle is outward in a lane width direction on the basis of a lane center of the target lane, wherein when it is determined by the determination unit that the direction of the vehicle is outward in the lane width direction on the basis of the lane center of the target lane, the trajectory generation unit generates the target travel trajectory on the assumption that the direction of the vehicle is a direction along the lane center of the target lane or is inward in the lane width direction on the basis of the lane center of the target lane.

When the direction of the vehicle is outward in the lane width direction on the basis of the lane center of the target lane, the vehicle travel control device generates a target travel trajectory on the assumption that the direction of the vehicle is a direction along the lane center of the target lane or is inward in the lane width direction on the basis of the lane center of the target lane, and thus it is possible to prevent the target travel trajectory from drawing an arc so as to expand in the outside direction (direction away from the lane center) of the travel lane. Thus, when the travel control device makes the vehicle travel on the basis of the target travel trajectory, it is possible to prevent the vehicle from departing from the travel lane.

In an embodiment, the trajectory generation unit may generate the target travel trajectory, using a travel lane along which the vehicle travels as the target lane. In this case, when the travel control device causes the vehicle to be located at the lane center of the travel lane of the vehicle, it is possible to prevent the vehicle from departing from the travel lane.

In an embodiment, the trajectory generation unit may generate the target travel trajectory, using a lane adjacent to a travel lane along which the vehicle travels as the target lane. In this case, when the travel control device changes a lane, for example, from the travel lane to an adjacent lane, it is possible to prevent the vehicle from departing from the travel lane to the opposite side to the adjacent lane of a lane change destination.

According to various aspects and embodiments of the present invention, when a vehicle is made to travel on the basis of the target travel trajectory from the travel position to the target lateral position, it is possible to prevent the vehicle from departing from the travel lane.

BRIEF DESCRIPTION OF THE DRAWINGS

FIGS. 7A to 7C are diagrams illustrating an example of target travel trajectories during a lane change.

FIGS. 8A to 8C are diagrams illustrating an example in which target travel trajectories are generated on the assumption of the direction of the vehicle.

DETAILED DESCRIPTION

Figure 1:
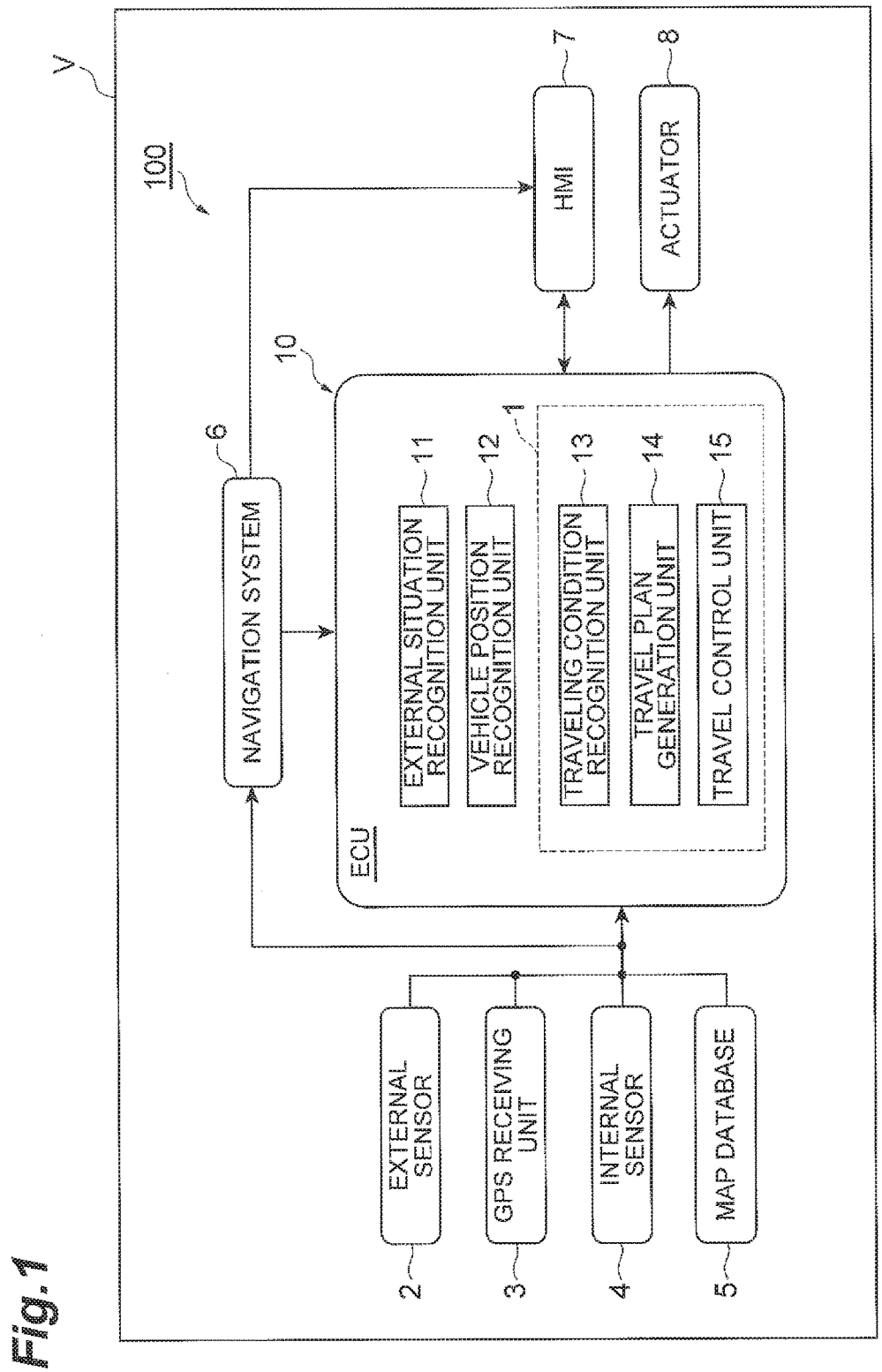
FIG. 1 is a block diagram illustrating a configuration of a vehicle including a vehicle travel control device according to a first embodiment.

Hereinafter, embodiments of the present invention will be described with reference to the accompanying drawings. Meanwhile, in the following description, the same or equivalent components are denoted by the same reference numerals and signs, and thus the description thereof will not be repeated.

First Embodiment

FIG. 1 is a block diagram illustrating a configuration of a vehicle V including a vehicle travel control device 1 according to a first embodiment. As shown in FIG. 1, a vehicle system 100 is mounted in the vehicle V such as a passenger car. The vehicle system 100 includes the vehicle travel control device 1. The vehicle travel control device 1 is a device that makes the vehicle V travel on the basis of a target travel trajectory. The target travel trajectory refers to, for example, a line connecting a travel position which is a target for the vehicle V in a lane having a predetermined interval. The wording "making the vehicle V travel" means travel based on automatic driving or travel based on driving assistance. As described later, the vehicle travel control device 1 is, for example, a device that makes the vehicle V travel based on automatic driving along a target travel trajectory, or a device that makes the vehicle V travel along a target travel trajectory through system intervention in the driving operation of a driver.

The vehicle system 100 includes an external sensor 2, a global positioning system (GPS) receiving unit 3, an internal sensor 4, a map database 5, a navigation system 6, a human machine interface (HMI) 7, an actuator 8, and an electric control unit (ECU) 10. The external sensor 2, the GPS receiving unit 3, the internal sensor 4, the map database 5, the navigation system 6, the HMI 7, the actuator 8, and the ECU 10 are connected to a network that performs communication using, for example, a controller area network (CAN) communication circuit, and can perform two-way communication.

The external sensor 2 is a detection device that detects an external situation which is peripheral information of the vehicle V. The external sensor 2 includes at least one of a camera, a radar, and a laser imaging detection and ranging (LIDAR).

The camera is an imaging device that images the external situation of the vehicle V. The camera is provided on, for example, the reverse side of the windshield of the vehicle V. The camera may be a monocular camera, and may be a stereo camera. The stereo camera includes, for example, two imaging units which are disposed so as to reproduce a binocular parallax. Imaging information of the stereo camera also includes depth-direction information. The camera outputs the imaging information about the external situation of the vehicle V to the ECU 10.

The radar detects an object outside of the vehicle V using radio waves. The radio waves are, for example, millimeter waves. The radar transmits radio waves to the periphery of the vehicle V and receives radio waves reflected from an object, to thereby detect the object. The radar can output, for example, a distance or a direction to the object as object information. The radar outputs the detected object information to the ECU 10. Meanwhile, when sensor fusion is performed at a subsequent stage, reception information of the reflected radio waves may be output to the ECU 10.

The LIDAR detects an object outside of the vehicle V using light. The LIDAR transmits light to the periphery of the vehicle V and receives light reflected from an object, to thereby measure a distance to a reflection point and detect the object. The LIDAR can output, for example, a distance or a direction to the object as object information. The LIDAR outputs the detected object information to the ECU 10. Meanwhile, when sensor fusion is performed at a subsequent stage, reception information of the reflected light may be output to the ECU 10. Meanwhile, the camera, the LIDAR and the radar are not necessarily required to be provided redundantly.

The GPS receiving unit 3 receives a signal from three or more GPS satellites, and acquires location information indicating the position of the vehicle V. The location information includes, for example, latitude and longitude. The GPS receiving unit 3 outputs the measured position information of the vehicle V to the ECU 10. Meanwhile, other means present in the vehicle V which are capable of specifying the latitude and longitude may be used instead of the GPS receiving unit 3.

The internal sensor 4 is a detector that detects information according to the traveling condition of the vehicle V. The internal sensor 4 includes a sensor that detects the direction of the vehicle. Such a sensor includes, for example, a yaw rate sensor. Alternatively, a sensor that detects a tire angle may be used as the sensor that detects the direction of the vehicle. Such a sensor includes, for example, a steering sensor. Meanwhile, the internal sensor 4 may further include a speed sensor and an acceleration sensor.

The yaw rate sensor is a detector that detects a yaw rate (rotational angular velocity) around the vertical axis of the centroid of the vehicle V. For example, a gyro sensor can be used as the yaw rate sensor. The yaw rate sensor outputs yaw rate information including the yaw rate of the vehicle V to the ECU 10.

The steering sensor is a, for example, detector that detects the rotational state of steering. The detection value of the rotational state is, for example, a steering torque or a rudder angle. The steering sensor is provided to, for example, the steering shaft of the vehicle V. The steering sensor outputs information including the steering torque or the rudder angle of steering to the ECU 10.

The speed sensor is a detector that detects the speed of the vehicle V. As the speed sensor, for example, a wheel speed sensor, provided to the wheel of the vehicle V or a drive shaft and the like rotating integrally with the wheel, which detects the rotational speed of the wheel may be used. The speed sensor outputs speed information (wheel speed information) including the speed of the vehicle V to the ECU 10.

The acceleration sensor is a detector that detects the acceleration of the vehicle V. The acceleration sensor includes, for example, a front-back acceleration sensor that detects the acceleration of the vehicle V in a front-back direction and a lateral acceleration sensor that detects the lateral acceleration of the vehicle V. The acceleration sensor outputs acceleration information including the acceleration of the vehicle V to the ECU 10.

The map database 5 is a database including map information. The map database 5 is formed within, for example, a hard disk drive (HDD) which is mounted in the vehicle V. The map information includes, for example, position information of a road, information of a road shape, and position information of an intersection point and a branching point. The information of a road shape includes, for example, a curve, the type of a straight-line portion, the curvature of the curve, and the like. Further, when the vehicle system 100 uses position information of a shielding structure such as a building or a wall, or a simultaneous localization and mapping (SLAM) technique, the output signal of the external sensor 2 may be included in the map information. Meanwhile, the map database 5 may be stored in a computer of a facility such as an information processing center capable of communicating with the vehicle V.

The navigation system 6 is a device that performs guidance to a destination, set on a map by a driver of the vehicle V, for the driver of the vehicle V. The navigation system 6 calculates a travel route of the vehicle V on the basis of the position information of the vehicle V measured by the GPS receiving unit 3 and the map information of the map database 5. The route may be, for example, a route in which the travel lane of the vehicle V is specified in the intervals of a plurality of lanes. The navigation system 6 calculates, for example, a target route from the position of the vehicle V to a destination, and notifies a driver of the target route through the indication of a display and the sound output of a speaker. The navigation system 6 outputs, for example, information of the target route of the vehicle V to the ECU 10. In addition, the navigation system 6 may be configured to include a gyro sensor, and output information for calculating the direction of the vehicle V to the ECU 10. Meanwhile, the navigation system 6 may use information which is stored in a computer of a facility such as an information processing center capable of communicating with the vehicle V. For example, the navigation system 6 may acquire traffic jam information indicating the congestion of a road through communication from the computer of a facility. In addition, a portion of processing performed by the navigation system 6 may be performed by the computer of a facility.

The HMI 7 is an interface for outputting and inputting information between an occupant (including a driver) of the vehicle V and the vehicle system 100. The HMI 7 includes, for example, a display panel for displaying image information to an occupant, a speaker for outputting a sound, an operation button or a touch panel for an occupant to perform an input operation, and the like. The HMI 7 includes an ON/OFF switch which is an input unit that inputs an occupant's request operation of automatic driving start or driving assistance start. The ON/OFF switch may be configured to be capable of inputting a request operation according to an automatic driving end or a driving assistance end. When a request operation according to the start or end of automatic driving or driving assistance is performed by an occupant, the ON/OFF switch outputs information indicating the start or end of automatic driving or driving assistance to the ECU 10. Meanwhile, the input unit is not limited to a switch, and any unit may be used insofar as the unit can input information capable of determining an occupant's intention of the start or end of automatic driving or driving assistance. For example, the input unit may be a start button, an end button or the like, and may be an object of a switch or a button which is displayed on a screen capable of being operated by an occupant. The HMI 7 may output information to an occupant using a portable information terminal which is wirelessly connected, and may receive an input operation by an occupant using a portable information terminal.

The actuator 8 is a device that executes travel control of the vehicle V. The actuator 8 includes at least an engine actuator, a brake actuator, and a steering actuator. The engine actuator controls the amount of air (throttle opening) supplied to an engine in accordance with a control signal from the ECU 10, and controls the driving force of the vehicle V. Meanwhile, when the vehicle V is a hybrid car or an electric automobile, the engine actuator controls the driving force of a motor as a motive power source.

The brake actuator controls a braking system in accordance with a control signal from the ECU 10, and controls a braking force which is given to the wheel of the vehicle V. As the braking system, for example, a hydraulic braking system can be used. The steering actuator controls the driving of an assist motor that controls a steering torque in an electromotive power steering system, in accordance with the control signal from the ECU 10. Thereby, the steering actuator controls the steering torque of the vehicle V.

The ECU 10 controls the vehicle V. The ECU 10 is an electronic control unit including a central processing unit (CPU), a read only memory (ROM), a random access memory (RAM), a CAN communication circuit, and the like. The ECU 10 is connected to a network that performs communication using, for example, the CAN communication circuit, and is communicably connected to the above-mentioned components of the vehicle V. The ECU 10 inputs and outputs data by bringing the CAN communication circuit into operation, for example, on the basis of a signal which is output by the CPU, stores the input data to the RAM, loads a program stored in the ROM to the RAM, and executes the program loaded to the RAM, to thereby realize functions of the components of the ECU 10 described later. Meanwhile, the ECU 10 may be constituted by a plurality of electronic control units.

The ECU 10 includes an external situation recognition unit 11, a vehicle position recognition unit 12, a traveling condition recognition unit 13 (an example of an acquisition unit), a travel plan generation unit 14 (an example of a determination unit and a trajectory generation unit), and a travel control unit 15 (an example of a travel control unit). The vehicle travel control device 1 is configured to include the traveling condition recognition unit 13, the travel plan generation unit 14, and the travel control unit 15. The vehicle travel control device 1 may include the traveling condition recognition unit 13, the travel plan generation unit 14, and the travel control unit 15, and is not necessarily required to include the external situation recognition unit 11 and the vehicle position recognition unit 12.

The external situation recognition unit 11 recognizes the external situation of the vehicle V on the basis of peripheral information of the vehicle V. The external situation recognition unit 11 is realized by, for example, bringing the CAN communication circuit into operation on the basis of a signal which is output by the CPU, loading a program stored in the ROM to the RAM, and executing the program loaded to the RAM.

The peripheral information is information indicating an environment or a situation within a predetermined range of the vehicle V. For example, the external situation recognition unit 11 acquires a detection result of the external sensor 2, as the peripheral information of the vehicle V. The detection result of the external sensor 2 includes, for example, imaging information of a camera, object information of a radar, object information of a LIDAR, or the like. Alternatively, the external situation recognition unit 11 may acquire information of the navigation system 6, as the peripheral information of the vehicle V, through communication.

The external situation of the vehicle V refers to an environment or a situation within a predetermined range of the vehicle V. For example, the external situation of the vehicle V includes branching of a travel road, a junction point, traffic regulations, the position of the lane boundary line of a travel lane with respect to the vehicle V or the position and road width of the lane center, the shape of a road, and the like. The shape of a road is, for example, the curvature of a travel lane, the inclination change of a road surface effective in the visibility of estimation of the external sensor 2, undulation, or the like. In addition, the external situation of the vehicle V may be the situation of objects such as an obstacle in the vicinity of the vehicle V or other vehicles. The situation of an object may include, for example, information for distinguishing between a fixed obstacle and a moving obstacle, the position of an obstacle with respect to the vehicle V, the moving direction of an obstacle with respect to the vehicle V, the relative speed of an obstacle with respect to the vehicle V, and the like.

The vehicle position recognition unit 12 recognizes the vehicle position (position of the vehicle V on a map) of the vehicle V. The vehicle position recognition unit 12 is realized by, for example, bringing the CAN communication circuit into operation on the basis of a signal which is output by the CPU, loading a program stored in the ROM to the RAM, and executing the program loaded to the RAM. The vehicle position recognition unit 12 recognizes, for example, the position of the vehicle V on a map, on the basis of the position information of the vehicle V received in the GPS receiving unit 3 and the map information of the map database 5. Meanwhile, the vehicle position recognition unit 12 may acquire and recognize a vehicle position used in the navigation system 6 from the navigation system 6. When the vehicle position can be measured by a sensor installed outside such as on a road, the vehicle position recognition unit 12 may acquire the vehicle position from this sensor through communication.

The traveling condition recognition unit 13 recognizes the traveling condition of the vehicle V on the basis of the detection result of the internal sensor 4. The traveling condition recognition unit 13 is realized by, for example, bringing the CAN communication circuit into operation on the basis of a signal which is output by the CPU, loading a program stored in the ROM to the RAM, and executing the program loaded to the RAM. The detection result of the internal sensor 4 includes, for example, yaw rate information of the yaw rate sensor. Alternatively, the detection result of the internal sensor 4 may include the rudder angle of the steering sensor. In addition, the detection result of the internal sensor 4 may include speed information of the speed sensor, acceleration information of the acceleration sensor, or the like.

The direction of the vehicle V and the travel position of the vehicle V are included in information indicating the traveling condition of the vehicle V. The traveling condition recognition unit 13 recognizes the direction of the vehicle V and the travel position of the vehicle V on the basis of the recognition results of the external situation recognition unit 11 and the vehicle position recognition unit 12 and the detection result of the internal sensor 4. The direction of the vehicle V refers to, for example, the direction of the vehicle V with respect to the travel lane of the vehicle V, and a direction to which the vehicle V is directed with respect to the extending direction (direction to which the vehicle V travels) of the travel lane of the vehicle V, as a more specific example. For example, the direction of the vehicle V can be represented by a yaw angle at which the extending direction of the lane center of the travel lane is set to 0. The yaw angle can be calculated from, for example, the yaw rate information. Alternatively, the direction of the vehicle V may be estimated from the rudder angle of the steering sensor. Alternatively, the direction of the vehicle V may be acquired from the navigation system 6. Alternatively, the direction of the vehicle V may be acquired on the basis of only the detection result of the lane boundary line which is obtained from the external sensor 2 (camera) or the like. In addition, the travel position of the vehicle V refers to a vehicle position when the vehicle V travels, and is a position serving as the starting point of a target travel trajectory.

The travel plan generation unit 14 generates a target travel trajectory. The travel plan generation unit 14 is realized by, for example, bringing the CAN communication circuit into operation on the basis of a signal which is output by the CPU, loading a program stored in the ROM to the RAM, and executing the program loaded to the RAM. The target travel trajectory is used in, for example, automatic driving or driving assistance for performing control so that the vehicle V does not depart from the travel lane.

The automatic driving refers to, for example, controlling travel of the vehicle V using a target travel trajectory. That is, the automatic driving refers to, for example, realizing travel of the vehicle V through only the control of the vehicle system 100 in a state where a driver's intervention is not performed, without performing a driver's steering operation. The driving assistance refers to, for example, making the vehicle V travel in coordination with the steering operation on the basis of the target travel trajectory and the amount of the steering operation. That is, the driving assistance refers to a state where both the driver and the vehicle system 100 can be related to the travel of the vehicle V, and realizing the travel of the vehicle V on the basis of at least the amount of the driver's steering operation in a state where system intervention can be performed.

The travel plan generation unit 14 generates a target travel trajectory in advance before vehicle control. The wording "before vehicle control" refers to before the execution of control, and may be during automatic driving or during driving assistance. For example, when information indicating the start of automatic driving or driving assistance is acquired from an ON/OFF switch, the travel plan generation unit 14 may generate a target travel trajectory.

The travel plan generation unit 14 generates a target travel trajectory from a travel position to a target lateral position, for example, on the basis of the direction and travel position of the vehicle V recognized by the traveling condition recognition unit 13, and the target lateral position. The target lateral position refers to the position of a lane width in a lateral direction which is set in a target lane and serves as, for example, a target of vehicle control. The target lane refers to a target lane along which the vehicle V is made to travel. When automatic driving or driving assistance is performed so that the vehicle V does not depart from the travel lane, the target lane serves as a travel lane (lane along which the vehicle V travels). The target lateral position may be set during automatic driving or during driving assistance, and may be set in advance. An example of the target lateral position includes a lane center position, a position which is offset from the lane center position by a predetermined distance, or the like.

Figure 2:
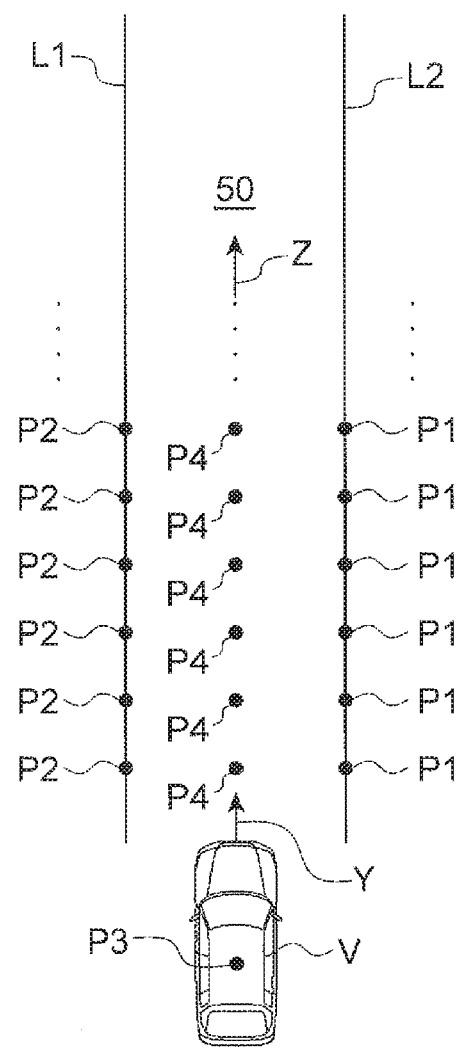
FIG. 2 is a diagram illustrating an example of target lateral positions.

FIG. 2 is a diagram illustrating an example of the target lateral position. In the example shown in FIG. 2, a scene is shown in which the vehicle V travels along a travel lane 50 partitioned by lane boundary lines L1 and L2. As shown in FIG. 2, the vehicle V travels along the travel lane 50 at a travel position P3 in a direction Y. Herein, the target lateral position is P4 which is set to a lane center position. The target lateral position P4 is calculated (detected) on the basis of, for example, the positions of the lane boundary lines L1 and L2. As a more specific example, the target lateral position P4 is a lane center position, and is calculated as an intermediate position between predetermined positions P1 and P2 of the lane boundary lines L1 and L2. A plurality of target lateral positions P4 may be calculated at predetermined intervals in front of the vehicle V along the travel lane 50. In the drawing, continuous target lateral positions P4 are shown. A direction Z passing through the continuous target lateral positions P4 is a direction along the lane center. In other words, the direction Z passing through the continuous target lateral positions P4 is set to the extending direction of the travel lane 50 (extending direction of the lane center position of the target lane).

Figure 3:
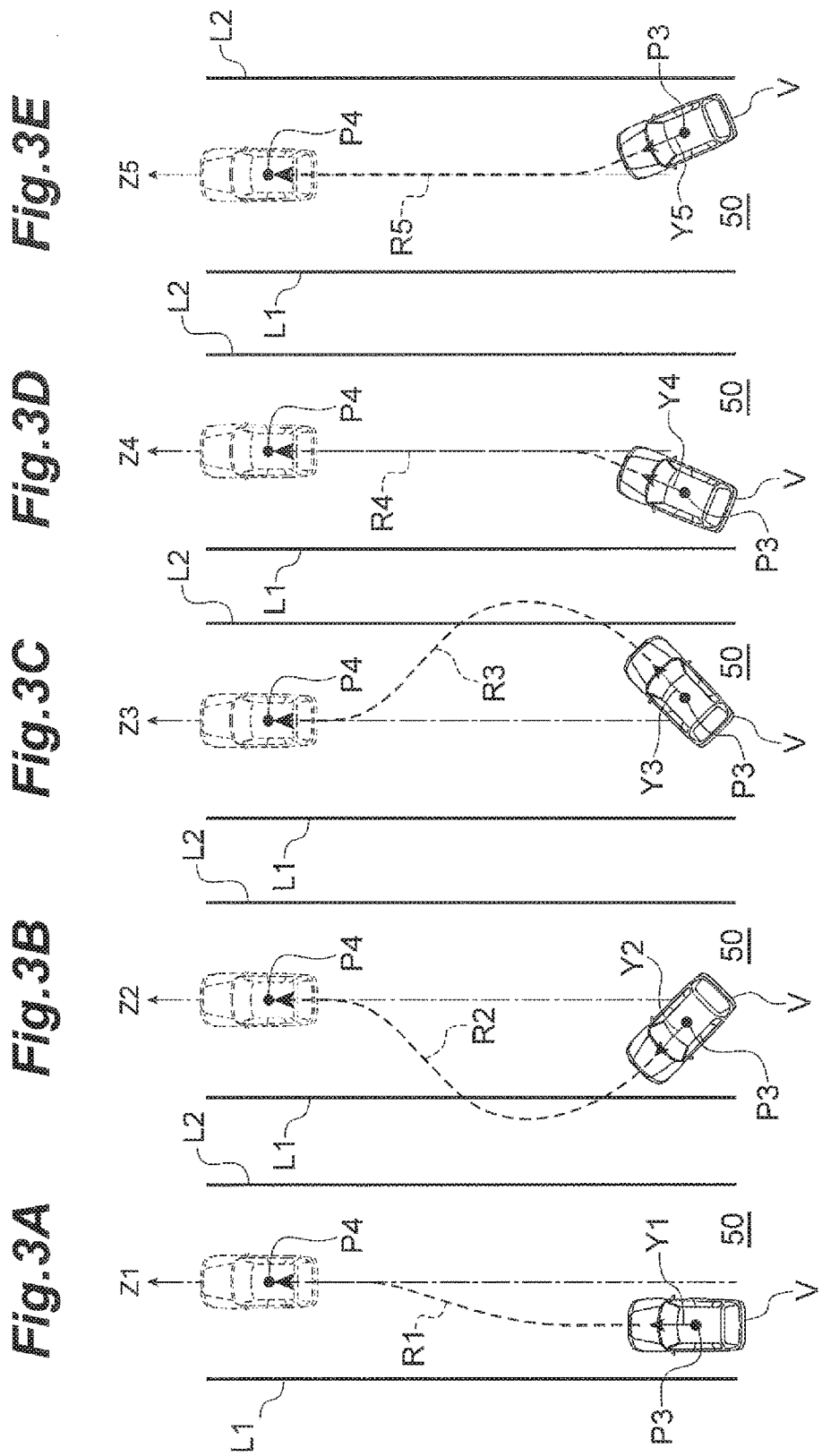
FIGS. 3A to 3E are diagrams illustrating an example of target travel trajectories.

The travel plan generation unit 14 generates, for example, a target travel trajectory using a geometric method on the basis of the direction Y of the vehicle V, the travel position P3, and the target lateral position P4. FIGS. 3A to 3E are diagrams illustrating an example of target travel trajectories. As shown in FIG. 3A, the travel plan generation unit 14 generates a target travel trajectory R1 smoothly connecting the travel position P3 and the lane center position (target lateral position P4), using a geometric method, under constraint conditions in which a starting point is set to the travel position P3, an end point is set to the lane center position (target lateral position P4) in front of the vehicle V, and the extending direction of a trajectory at the travel position P3 is set to a direction Y1. The travel plan generation unit 14 generates a target travel trajectory, for example, using a composite clothoid curve. Alternatively, the travel plan generation unit 14 may generate a target travel trajectory using not only the travel position P3 and the lane center position (target lateral position P4), but also a target speed and a target time. In this case, the travel plan generation unit 14 generates a target travel trajectory capable of reaching the lane center position (target lateral position P4) within the target time at the target speed. Alternatively, the travel plan generation unit 14 may generate a target travel trajectory so that the vehicle V travels in a state of satisfying a criterion such as safety, legal compliance, or travel efficiency. Further, the travel plan generation unit 14 may generate a target travel trajectory of the vehicle V so as to avoid contact with an object, on the basis of the situation of an object in the vicinity of the vehicle V.

Here, the direction of the vehicle V may be set to be outward in a lane width direction or to be inward in the lane width direction, on the basis of the target lateral position P4 in the travel lane 50. More specifically, when the target lateral position P4 is a lane center position, the direction of the vehicle V may be set to be outward in the lane width direction or to be inward in the lane width direction, on the basis of the lane center of the travel lane 50. Hereinafter, a case where the target lateral position P4 is a lane center position will be described by way of example.

Initially, outward in the lane width direction will be described. The wording "outward in the lane width direction on the basis of the lane center" means that the vehicle V is directed to the lane boundary line rather than the lane center. That is, this lane boundary line is a left lane boundary line of the travel lane when the travel position is located further left than the lane center position (target lateral position), and is a right lane boundary line of the travel lane when the travel position is located further right than the lane center position (target lateral position). For example, in the example shown in FIG. 3B, the direction of the vehicle V is set to be outward (direction Y2) in the lane width direction on the basis of the lane center (continuous target lateral positions P4) of the travel lane 50, and is directed to the lane boundary line L1. Similarly, in the example shown in FIG. 3C, the direction of the vehicle V is set to be outward (direction Y3) in the lane width direction on the basis of the lane center (continuous target lateral positions P4) of the travel lane 50, and is directed to the lane boundary line L2. Meanwhile, in a case where the vehicle V is directed to the lane boundary line rather than the lane center even when the vehicle V is present at the lane center, the direction of the vehicle V is set to be outward in the lane width direction on the basis of the lane center. In a case where a target travel trajectory R2 (target travel trajectory R3) smoothly connecting the travel position P3 and the lane center position (target lateral position P4) in front of the vehicle V is generated using the above-mentioned method when the vehicle V is outward in the lane width direction on the basis of the lane center, the target travel trajectory R2 (target travel trajectory R3) is set to a trajectory expanding in the outside direction of the travel lane 50, and thus there may be a concern that the target travel trajectory R2 (target travel trajectory R3) and the lane boundary line L1 (lane boundary line L2) intersect each other.

Next, inward in the lane width direction will be described. The wording "inward in the lane width direction on the basis of the lane center" means that the vehicle V is directed to the lane center. For example, in the examples shown in FIGS. 3D and 3E, the direction of the vehicle V is set to be inward (directions Y4 and Y5) in the lane width direction on the basis of the lane center (continuous target lateral positions P4) of the travel lane 50, and is directed to the lane center. In a case where a target travel trajectory R4 (target travel trajectory R5) smoothly connecting the travel position P3 and the lane center position (target lateral position P4) in front of the vehicle V is generated using the above-mentioned method when the vehicle V is inward in the lane width direction on the basis of the lane center, the target travel trajectory R4 (target travel trajectory R5) and the lane boundary lines L1 and L2 do not intersect each other. Meanwhile, even when the direction of the vehicle V is a direction along the lane center (the same direction as the extending direction of the target lateral position P4), the target travel trajectory does not intersect the lane boundary lines L1 and L2.

As described above, in a case where the target travel trajectories R2 and R3 are adopted when the direction of the vehicle V is set to be outward in the lane width direction on the basis of the lane center (continuous target lateral positions P4), there may be a concern that the vehicle V departs from the travel lane 50. For this reason, the travel plan generation unit 14 determines whether the direction of the vehicle V is outward in the lane width direction on the basis of the lane center (continuous target lateral positions P4) of the travel lane 50, as a process of generating a target travel trajectory, on the basis of the recognition result of the traveling condition recognition unit 13. When it is determined that the direction of the vehicle V is outward in the lane width direction on the basis of the lane center (continuous target lateral positions P4) of the travel lane 50, the travel plan generation unit 14 assumes that the direction of the vehicle V is a direction along the lane center of the travel lane 50. Alternatively, the travel plan generation unit 14 assumes that the direction of the vehicle V is inward in the lane width direction on the basis of the lane center (continuous target lateral positions P4) of the target lane. Meanwhile, the term "assume" as used herein refers to changing the direction of the vehicle V which is used in calculation. The travel plan generation unit 14 generates a target travel trajectory using the assumed direction of the vehicle V.

Figure 4:
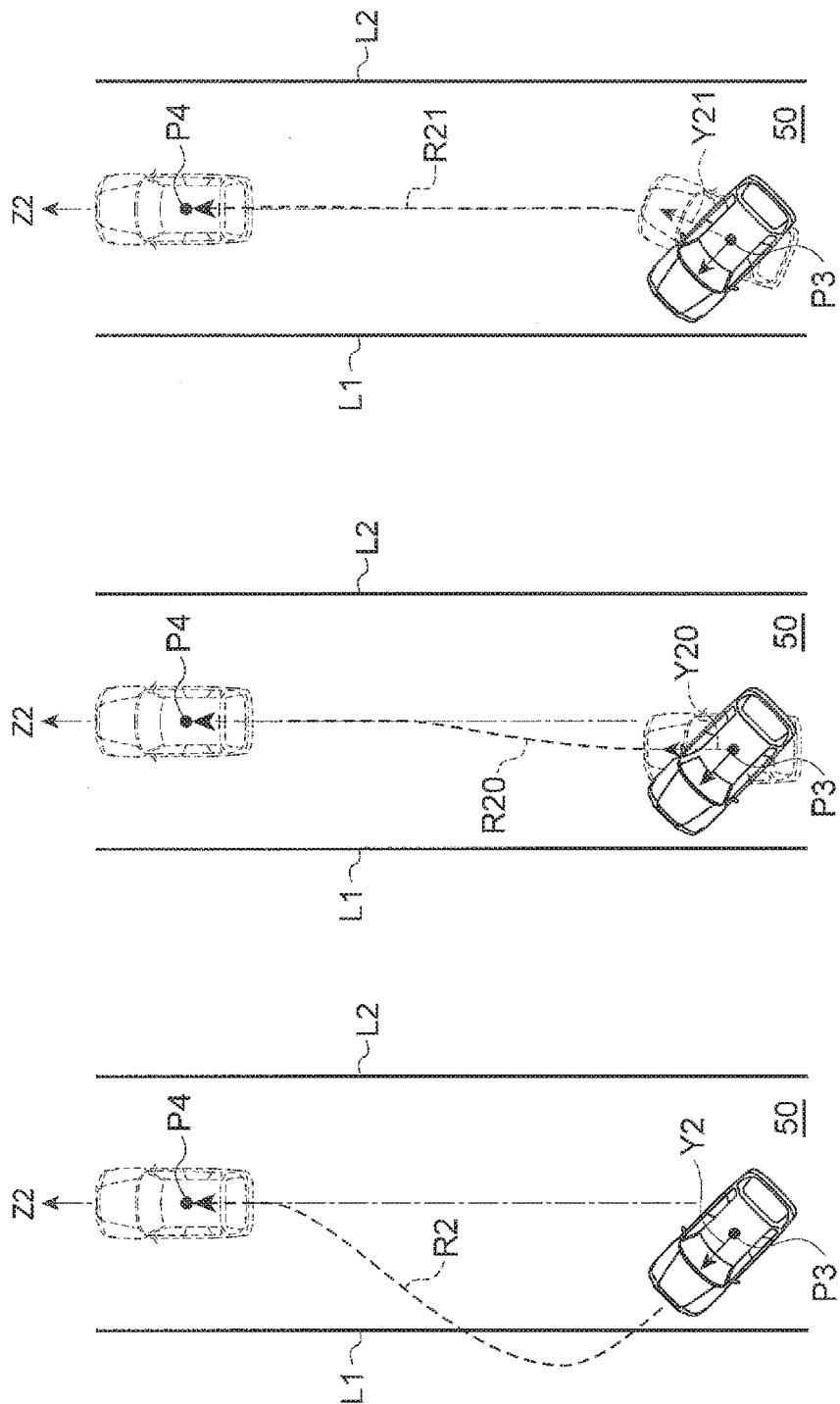
FIGS. 4A to 4C are diagrams illustrating an example in which target travel trajectories are generated on the assumption of the direction of the vehicle.

FIGS. 4A to 4C are diagrams illustrating an example in which target travel trajectories are generated on the assumption of the direction of the vehicle. FIG. 4A is the same as the scene shown in FIG. 3B, and the direction of the vehicle V is set to be outward (direction Y2) in the lane width direction on the basis of the lane center (continuous target lateral positions P4) in the travel lane 50 and is directed to the lane boundary line L1. For this reason, when it is determined that the direction of the vehicle V is outward in the lane width direction on the basis of the lane center (continuous target lateral positions P4), the travel plan generation unit 14 assumes that the direction of the vehicle V is a direction along the lane center (continuous target lateral positions P4), as shown in FIG. 4B. That is, the travel plan generation unit 14 replaces the direction Y2 of the vehicle V with a direction Y20. Alternatively, as shown in FIG. 4C, the travel plan generation unit 14 assumes that the direction of the vehicle V is inward in the lane width direction on the basis of the lane center (continuous target lateral positions P4). That is, the travel plan generation unit 14 replaces the direction Y2 of the vehicle V with a direction Y21. The travel plan generation unit 14 generates a target travel trajectory using the assumed direction of the vehicle V. Thereby, any of target travel trajectories R20 and R21 having no possibility of lane departure is generated instead of the target travel trajectory R2 having the possibility of lane departure.

The travel control unit 15 makes the vehicle V travel using a target travel trajectory. The travel control unit 15 is realized by, for example, bringing the CAN communication circuit into operation on the basis of a signal which is output by the CPU, loading a program stored in the ROM to the RAM, and executing the program loaded to the RAM. In the case of automatic driving, the travel control unit 15 outputs a control signal to the actuator 8 on the basis of the target travel trajectory generated by the travel plan generation unit 14, and controls the travel of the vehicle V. On the other hand, in the case of driving assistance, the travel control unit 15 performs system intervention on the basis of the target travel trajectory generated by the travel plan generation unit 14 while reflecting a driver's steering input in the travel of the vehicle V.

Figure 5:
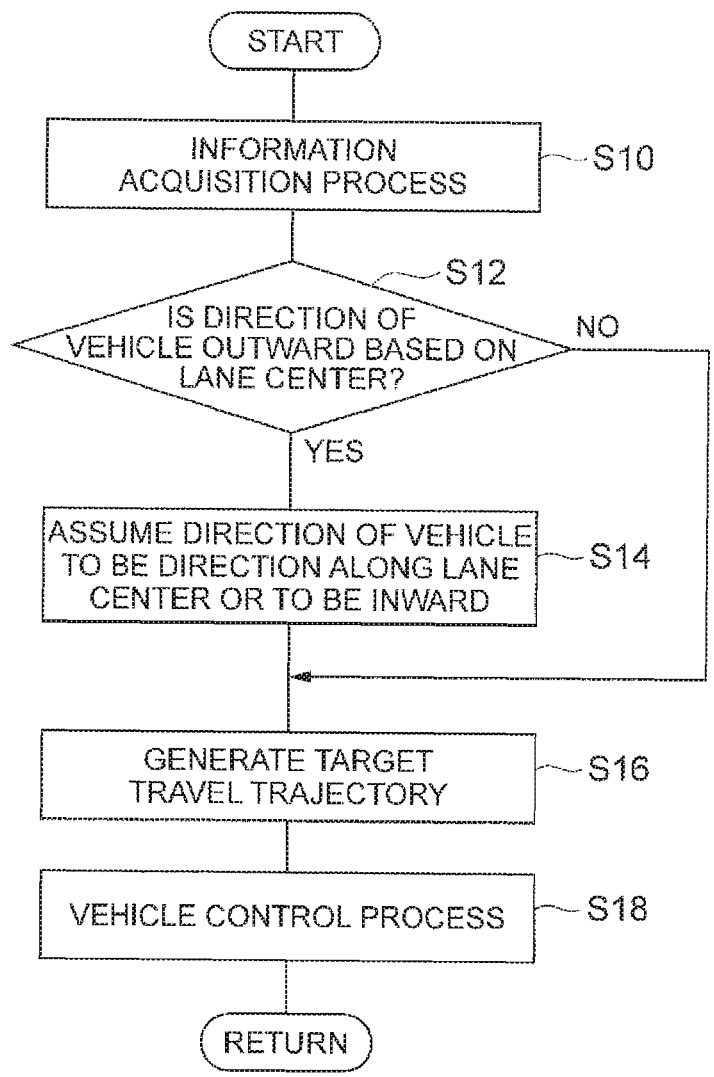
FIG. 5 is a flow diagram illustrating an example of a vehicle control process of the vehicle travel control device according to the first embodiment.

Next, processes which are performed by the vehicle travel control device 1 will be described. FIG. 5 is a flow diagram illustrating an example of a vehicle control process of the vehicle travel control device 1 according to the present embodiment. The control process shown in FIG. 5 is executed, for example, when information indicating the start of automatic driving or driving assistance is input by an ON/OFF switch.

As shown in FIG. 5, the vehicle travel control device 1 acquires the peripheral information of the vehicle V, as an information acquisition process (S10). First, the vehicle position recognition unit 12 recognizes a vehicle position on the basis of the position information of the vehicle V received in the GPS receiving unit 3 and the map information of the map database 5. The external situation recognition unit 11 recognizes the external situation of the vehicle V on the basis of the detection result of the external sensor 2 or provided information of the navigation system 6. The traveling condition recognition unit 13 recognizes the traveling condition of the vehicle V on the basis of the recognition result of the external situation recognition unit 11 and the detection result of the internal sensor 4. That is, in the information acquisition process, at least the direction of the vehicle V, the travel position, the lane boundary line of the travel lane, and the target lateral position are acquired.

Next, the travel plan generation unit 14 determines whether the direction of the vehicle V acquired in the information acquisition process is outward in the lane width direction, as a determination process (S12) in a vehicle direction, on the basis of the lane center (continuous target lateral positions P4). For example, as shown in FIGS. 3B and 3C, when the direction of the vehicle V is directed to the lane boundary line on the basis of the lane center (continuous target lateral positions P4), the travel plan generation unit 14 determines that the direction of the vehicle V is outward in the lane width direction. When the direction of the vehicle V is outward, the process proceeds to an assumption process in the vehicle direction.

The travel plan generation unit 14 assumes that the direction of the vehicle V is a direction along the lane center (extending direction Z of continuous target lateral positions P4), as an assumption process (S14) in the vehicle direction (FIG. 4B). Alternatively, the travel plan generation unit 14 assumes that the direction of the vehicle V is inward in the lane width direction on the basis of the lane center (continuous target lateral positions P4) (FIG. 4C). When the assumption process is terminated, the process proceeds to a target travel trajectory generation process.

The travel plan generation unit 14 generates a target travel trajectory smoothly connecting the travel position and the target lateral position, using a geometric method, under constraint conditions in which a starting point is set to the travel position, an end point is set to the target lateral position in front of the vehicle V, and the extending direction of a trajectory at the travel position is set to the vehicle direction of the travel position, as the target travel trajectory generation process (S16). Here, the travel plan generation unit 14 generates a target travel trajectory using the direction of the vehicle assumed in the assumption process of S14. Thereby, any of the target travel trajectories R20 and R21 shown in FIGS. 4B and 4C is generated. When the target travel trajectory generation process is terminated, the process proceeds to the vehicle control process.

The travel control unit 15 makes the vehicle V travel using the target travel trajectory, as the vehicle control process (S18). When the vehicle control process is terminated, the control process shown in FIG. 5 is terminated.

On the other hand, when the direction of the vehicle V is not outward on the basis of the lane center (continuous target lateral positions P4) in the determination process of S12, the process proceeds to the target travel trajectory generation process, the travel plan generation unit 14 generates a target travel trajectory using the direction of the vehicle V acquired in the information acquisition process (S16), and the travel control unit 15 makes the vehicle V travel using the target travel trajectory (S18). When the vehicle control process is terminated, the control process shown in FIG. 5 is terminated.

As described above, the operation of the vehicle travel control device 1 shown in FIG. 5 is terminated. By executing the flow diagram shown in FIG. 5, when the direction of the vehicle V is outward in the vehicle width direction on the basis of the lane center (continuous target lateral positions P4), the vehicle travel control device 1 assumes that the direction of the vehicle V is a direction along the lane center (extending direction Z of the continuous target lateral positions P4), or assumes that the direction of the vehicle V is inward in the lane width direction on the basis of the lane center (continuous target lateral positions P4). Therefore, when the vehicle V is made to travel on the basis of the target travel trajectory from the travel position P3 to the lane center position (target lateral position P4), it is possible to prevent the vehicle V from departing from the travel lane 50.

As described above, according to the vehicle travel control device 1 of the first embodiment, when the vehicle V is caused to be located at the target lateral position P4 of the travel lane 50 of the vehicle V, it is possible to prevent the vehicle V from departing from the travel lane 50.

In addition, according to the vehicle travel control device 1 of the first embodiment, when the direction Y of the vehicle V is outward in the lane width direction on the basis of the lane center (continuous target lateral positions P4), a target travel trajectory is generated on the assumption that the direction of the vehicle V is a direction along the lane center (extending direction Z of the continuous target lateral positions P4), or on the assumption that the direction Y of the vehicle V is inward in the lane width direction on the basis of the lane center (continuous target lateral positions P4), and thus it is possible to prevent the target travel trajectory from drawing an arc so as to expand in the outside direction of the travel lane 50 (direction away from the lane center). Thus, when this travel control device makes the vehicle travel on the basis of the target travel trajectory, it is possible to prevent the vehicle from departing from the travel lane.

Second Embodiment

Next, a vehicle travel control device 1A according to a second embodiment will be described. In the present embodiment, the same configurations and processes as those in the first embodiment will not be described, and differences from the first embodiment will be described.

Figure 6:
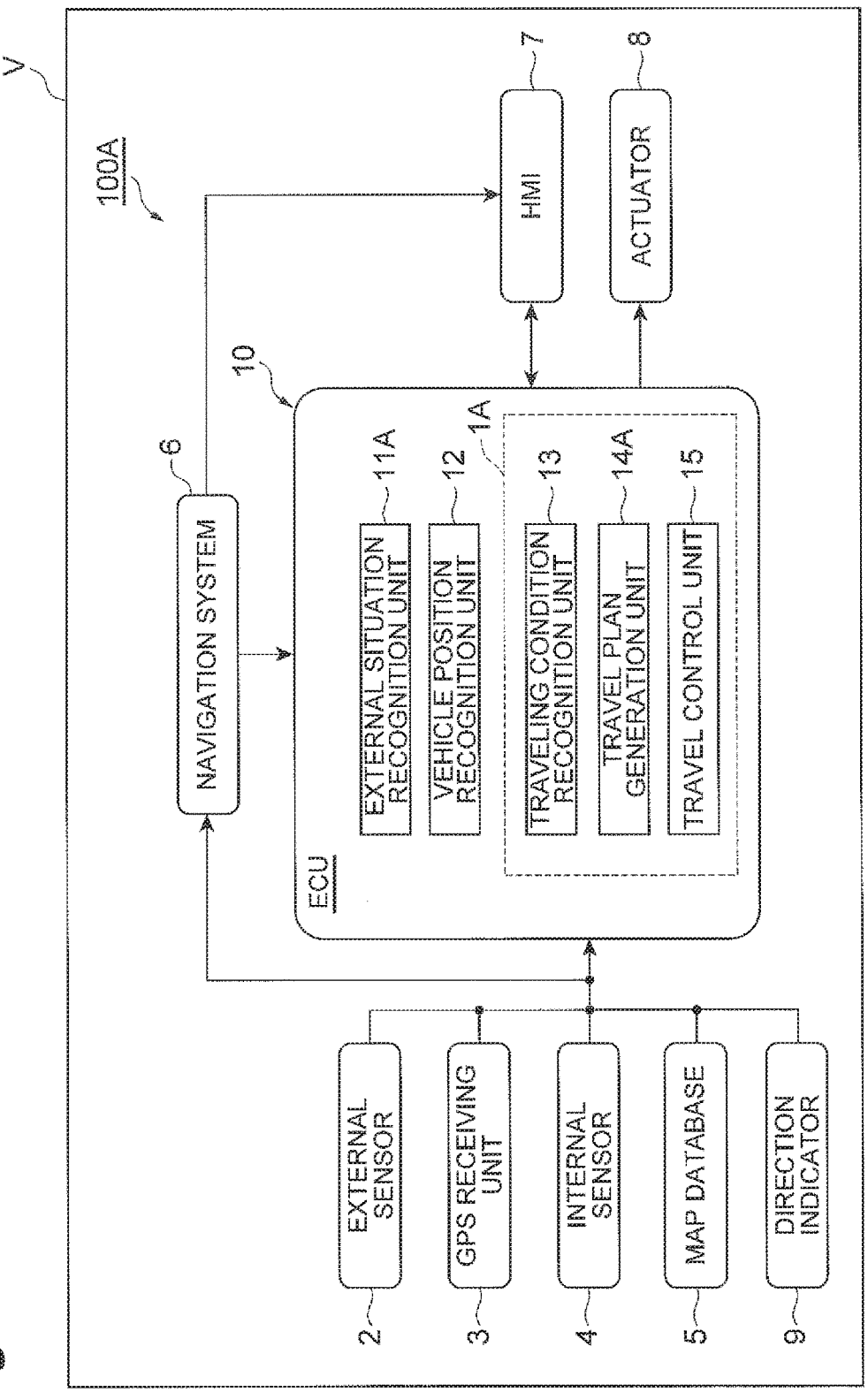
FIG. 6 is a block diagram illustrating a configuration of the vehicle including a vehicle travel control device according to a second embodiment.

The vehicle travel control device 1A according to the present embodiment is a device that changes the lane of the vehicle V from the travel lane to an adjacent lane on the basis of a target travel trajectory. FIG. 6 is a block diagram illustrating a configuration of the vehicle V including the vehicle travel control device 1A according to the second embodiment. As shown in FIG. 6, a vehicle system 100A is the same as the vehicle system 100 of the first embodiment, except that a direction indicator 9, an external situation recognition unit 11A, and a travel plan generation unit 14 are included therein.

The direction indicator 9 is a device that inputs a driver's operation of the vehicle V, and is constituted by, for example, a blinker lever and an operation detection unit. The operation detection unit is provided to, for example, the blinker lever, and detects an operation of the blinker lever which is performed by a driver of the vehicle V. The operation detection unit detects whether a driver's operation of the blinker lever is an operation of a right blinker or an operation of a left blinker, as operation information. The direction indicator 9 outputs the detected operation information to the ECU 10.

The external situation recognition unit 11A has an increase in the type of information recognized as the external situation of the vehicle V, as compared to the external situation recognition unit 11. Specifically, the external situation of the vehicle V also includes the road width of an adjacent lane, a central position, the shape of a road, and the like. In addition, the external situation of the vehicle V may include information of other vehicles traveling along an adjacent lane.

The travel plan generation unit 14A is different from the travel plan generation unit 14 in target lane. The travel plan generation unit 14A sets a lane adjacent to the travel lane along which the vehicle V travels, to the target lane, on the basis of operation information of the direction indicator 9. The travel plan generation unit 14A sets a target lateral position in the adjacent lane.

The travel plan generation unit 14A generates a target travel trajectory using a geometric method, for example, on the basis of the direction Y of the vehicle V, the travel position P3, and a target lateral position P5. FIGS. 7A to 7C are diagrams illustrating an example of target travel trajectories during a lane change. In the examples shown in FIGS. 7A to 7C, scenes are shown in which the vehicle V travels along the travel lane 50 partitioned by the lane boundary lines L1 and L2, and changes a lane to an adjacent lane 51 partitioned by lane boundary lines L2 and L3. As shown in FIG. 7A, the travel plan generation unit 14A generates a target travel trajectory R6 smoothly connecting the travel position P3 and the lane center position (target lateral position P5), using a geometric method, under constraint conditions in which a starting point is set to the travel position P3, an end point is set to the lane center position (target lateral position P5) of the adjacent lane 51, and the extending direction of a trajectory at the travel position P3 is set to a direction Y6. The travel plan generation unit 14A generates a target travel trajectory, for example, using a composite clothoid curve. Alternatively, the travel plan generation unit 14A may generate a target travel trajectory using not only the travel position P3 and the lane center position (target lateral position P5), but also a target speed and a target time. In this case, the travel plan generation unit 14A generates a target travel trajectory capable of reaching the lane center position (target lateral position) within the target time at the target speed. Alternatively, the travel plan generation unit 14A may generate a target travel trajectory so that the vehicle V travels in a state of satisfying a criterion such as safety, legal compliance, or travel efficiency. Further, the travel plan generation unit 14A may generate a target travel trajectory of the vehicle V so as to avoid contact with an object, on the basis of the situation of an object in the vicinity of the vehicle V.

Here, the direction of the vehicle V may be set to be outward in the lane width direction or to be inward in the lane width direction, on the basis of the lane center (continuous target lateral positions P5) of the adjacent lane 51. Initially, the wording "outward in the lane width direction" will be described. The wording "outward in the lane width direction on the basis of the lane center" as used herein is the same as that in the first embodiment, and means that the vehicle V is directed to the lane boundary line rather than the lane center (continuous target lateral positions P5). That is, this lane boundary line is a lane boundary line located on the opposite side to a lane change destination. For example, in the example shown in FIG. 7B, the direction of the vehicle V is set to be outward (direction Y7) in the lane width direction on the basis of the lane center (continuous target lateral positions P5) of the adjacent lane 51, and is directed to the lane boundary line L1. In a case where a target travel trajectory R7 smoothly connecting the travel position P3 and the lane center position (target lateral position P5) of the adjacent lane 51 is generated using the above-mentioned method when the vehicle V is outward in the lane width direction on the basis of the lane center (continuous target lateral positions P5) of the adjacent lane 51, the target travel trajectory R7 is set to a trajectory expanding in the outside direction of the travel lane 50, and thus there may be a concern that the target travel trajectory R7 and the lane boundary line L1 intersect each other.

Next, the wording "inward in the lane width direction" will be described. The wording "inward in the lane width direction on the basis of the lane center" as used herein is the same as that in the first embodiment, and means that the vehicle V is directed to the lane center (continuous target lateral positions P5). For example, in the example shown in FIG. 7C, a direction Y8 of the vehicle V is set to be inward (direction Y8) in the lane width direction on the basis of the lane center (continuous target lateral positions P5) of the adjacent lane 51, and is directed to the lane center. In a case where a target travel trajectory R8 smoothly connecting the travel position P3 and the lane center position (target lateral position P5) of the adjacent lane 51 is generated using the above-mentioned method when the vehicle V is inward in the lane width direction on the basis of the lane center (continuous target lateral positions P5) of the adjacent lane 51, the target travel trajectory R8 and the lane boundary line L1 do not intersect each other. Meanwhile, even when the direction of the vehicle V is a direction along the lane center of the adjacent lane 51 (the same direction as the extending direction of the target lateral position P5), the target travel trajectory does not intersect the lane boundary line L1.

As described above, in a case where the target travel trajectory R7 is adopted when the direction of the vehicle V is outward in the lane width direction on the basis of the lane center (continuous target lateral positions P5) of the adjacent lane 51, there may be a concern that the vehicle V departs from the travel lane 50. For this reason, the travel plan generation unit 14A determines whether the direction of the vehicle V is outward in the lane width direction on the basis of the lane center (continuous target lateral positions P5) of the adjacent lane 51, as a process of generating a target travel trajectory, on the basis of the recognition result of the traveling condition recognition unit 13. When it is determined that the direction of the vehicle V is outward in the lane width direction on the basis of the lane center (continuous target lateral positions P5) of the adjacent lane 51, the travel plan generation unit 14A assumes that the direction of the vehicle V is a direction along the lane center of the adjacent lane 51 (extending direction Z of the continuous target lateral positions P5). Alternatively, the travel plan generation unit 14A assumes that the direction of the vehicle V is inward in the lane width direction on the basis of the lane center (continuous target lateral positions P5) of the adjacent lane 51. Meanwhile, the term "assume" as used herein refers to changing the direction of the vehicle V which is used in calculation. The travel plan generation unit 14A generates a target travel trajectory using the assumed direction of the vehicle V.

FIGS. 8A to 8C are diagrams illustrating an example in which target travel trajectories are generated on the assumption of the direction of the vehicle. FIG. 8A is the same as the scene shown in FIG. 7B, and the direction of the vehicle V is set to be outward (direction Y7) in the lane width direction on the basis of the lane center (continuous target lateral positions P5) of the adjacent lane 51 and is directed to the lane boundary line L1. For this reason, when it is determined that the direction of the vehicle V is outward in the lane width direction on the basis of the lane center (continuous target lateral positions P5) of the adjacent lane 51, the travel plan generation unit 14A assumes that the direction of the vehicle V is a direction along the lane center of the adjacent lane 51 (extending direction Z of the continuous target lateral positions P5), as shown in FIG. 8B. That is, the travel plan generation unit 14A replaces the direction Y7 of the vehicle V with a direction Y70. Alternatively, as shown in FIG. 8C, the travel plan generation unit 14A assumes that the direction of the vehicle V is inward in the lane width direction on the basis of the lane center (continuous target lateral positions P5) of the adjacent lane 51. That is, the travel plan generation unit 14A replaces the direction Y2 of the vehicle V with a direction Y71. The travel plan generation unit 14A generates a target travel trajectory using the assumed direction of the vehicle V. Thereby, any of target travel trajectories R70 and R71 having no possibility of lane departure is generated instead of the target travel trajectory R7 having the possibility of lane departure.

Figure 9:
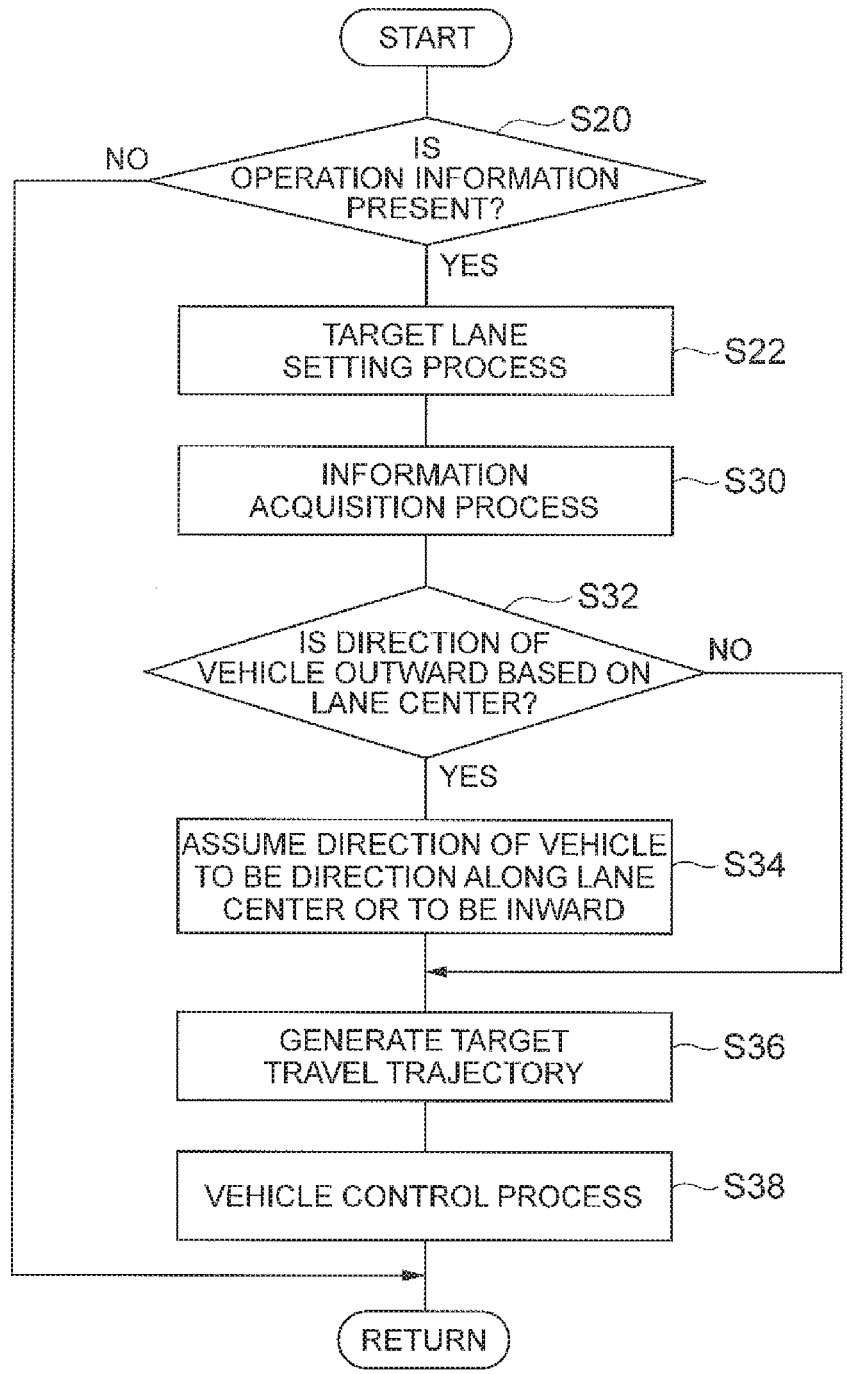
FIG. 9 is a flow diagram illustrating an example of a vehicle control process of the vehicle travel control device according to the second embodiment.

Next, processes which are performed by the vehicle travel control device 1A will be described. FIG. 9 is a flow diagram illustrating an example of a vehicle control process of the vehicle travel control device 1A according to the present embodiment. The control process shown in FIG. 9 is executed, for example, when information indicating the start of automatic driving or driving assistance is input by an ON/OFF switch.

As shown in FIG. 9, the travel plan generation unit 14A of the vehicle travel control device 1A determines whether operation information is acquired from the direction indicator 9, as an operation information determination process (S20). In the operation information determination process, when it is determined that the operation information is not acquired, the vehicle control process shown in FIG. 9 is terminated. On the other hand, in the operation information determination process, when is determined that the operation information is acquired, the process proceeds to a target lane setting process (S22).

The travel plan generation unit 14A sets a target lane on the basis of the operation information, as the target lane setting process (S22). For example, when the operation information is a right blinker, the travel plan generation unit 14A sets an adjacent lane located on the right side of the travel lane to the target lane. Alternatively, for example, when the operation information is a left blinker, the travel plan generation unit 14A sets an adjacent lane located on the left side of the travel lane to the target lane. When the target lane setting process is terminated, the process proceeds to an information acquisition process (S30).

The following processes S30 to S38 are the same as the processes of S10 to S18 shown in FIG. 5, except that the target lateral position is set in an adjacent lane.

As described above, the operation of the vehicle travel control device 1 shown in FIG. 9 is terminated. By executing the flow diagram shown in FIG. 9, when the direction of the vehicle V is outward in the vehicle width direction on the basis of the lane center (continuous target lateral positions P5) of the adjacent lane 51, the vehicle travel control device 1 assumes that the direction of the vehicle V is a direction along the lane center (continuous target lateral positions P5) of the adjacent lane 51 (extending direction Z of the continuous target lateral positions P5), or assumes that the direction of the vehicle V is inward in the lane width direction on the basis of the lane center (continuous target lateral positions P5) of the adjacent lane 51. Therefore, when the vehicle V is made to travel on the basis of the target travel trajectory from the travel position P3 to the target lateral position P5, it is possible to prevent the vehicle V from departing from the travel lane 50.

As described above, according to the vehicle travel control device 1A of the second embodiment, when a lane is changed from the travel lane 50 to the adjacent lane 51, it is possible to prevent the vehicle from departing from the travel lane 50 to the opposite side to the adjacent lane 51 of a lane change destination.

As described above, the embodiments of the present invention have been described, but the present invention is not limited to the aforementioned embodiments. The present invention also includes changes and modifications of the aforementioned embodiment on the basis of the knowledge of those skilled in the art.

For example, in the aforementioned embodiment, an example in which the lane center position is set to the target lateral position has been described, but the target lateral position is not limited to the lane center position, and may be a position which is offset from the lane center position. That is, the lane center of the target lane may have a width by an offset amount. Even in such a case, when the vehicle is made to travel on the basis of the target travel trajectory from the travel position to the target lateral position, it is possible to prevent the vehicle from departing from the travel lane.

In addition, in the aforementioned second embodiment, an example has been shown in which the adjacent lane is set to the target lane on the basis of the operation information of the direction indicator performed by a driver, but there is no limitation thereto. For example, when the external situation of the vehicle V is recognized by the external situation recognition unit 11, and the travel plan generation unit 14 generates a travel plan to pass or overtake a preceding vehicle on the basis of the external situation, or when the travel plan generation unit 14 generates a travel plan to change a lane on the basis of the map database, an adjacent lane can be set to the target lane on the basis of the travel plan.

What is claimed is:

1. A vehicle travel control device that makes a vehicle travel on the basis of a target travel trajectory, comprising:
   an acquisition unit configured to acquire a direction and a travel position of the vehicle;
   a trajectory generation unit configured to generate a target travel trajectory from the travel position to a lane center position of a target lane on the basis of a direction of the vehicle, the travel position and the lane center position of the target lane;
   a travel control unit configured to make the vehicle travel using the target travel trajectory; and
   a determination unit configured to determine whether the direction of the vehicle is directed outward of a lane center of the target lane in a lane width direction,
   wherein when it is determined by the determination unit that the direction of the vehicle is directed outward of the lane center of the target lane in the lane width direction, the trajectory generation unit generates the target travel trajectory on the assumption that the direction of the vehicle is a direction along the lane center of the target lane or is inward in the lane width direction on the basis of the lane center of the target lane.

2. The vehicle travel control device according to claim 1, wherein the trajectory generation unit generates the target travel trajectory, using a travel lane along which the vehicle travels as the target lane.

3. The vehicle travel control device according to claim 1, wherein the trajectory generation unit generates the target travel trajectory, using a lane adjacent to a travel lane along which the vehicle travels as the target lane.

4. A vehicle travel control device, comprising:
   an ECU configured to
   acquire a direction and a travel position of the vehicle;
   generate a target travel trajectory from the travel position to a lane center position of a target lane using a direction of the vehicle, the travel position, and the lane center position of the target lane;
   control the vehicle travel using the target travel trajectory; and
   determine whether the direction of the vehicle is angled away from a lane center of the target lane,
   wherein the ECU is configured to generate, in response to determining that the direction of the vehicle is away from the lane center of the target lane, the target travel trajectory using a travel direction that is parallel to the lane center of the target lane or is directed toward the lane center of the target lane.

* * * * *